T. BATTY.
SERVING MALLET.

No. 7,571. Patented Aug. 20, 1850.

UNITED STATES PATENT OFFICE.

THOS. BATTY, OF NEW YORK, N. Y.

SERVING-MALLET.

Specification of Letters Patent No. 7,571, dated August 20, 1850.

*To all whom it may concern:*

Be it known that I, THOMAS BATTY, of the city and county and State of New York, have invented certain new and useful Improvements in Serving-Mallets used by Riggers, &c.; and I do hereby declare that the following is a full, clear, and exact description of the same, reference being had to the accompanying drawings, forming part of this specification, in which—

Figure 1:
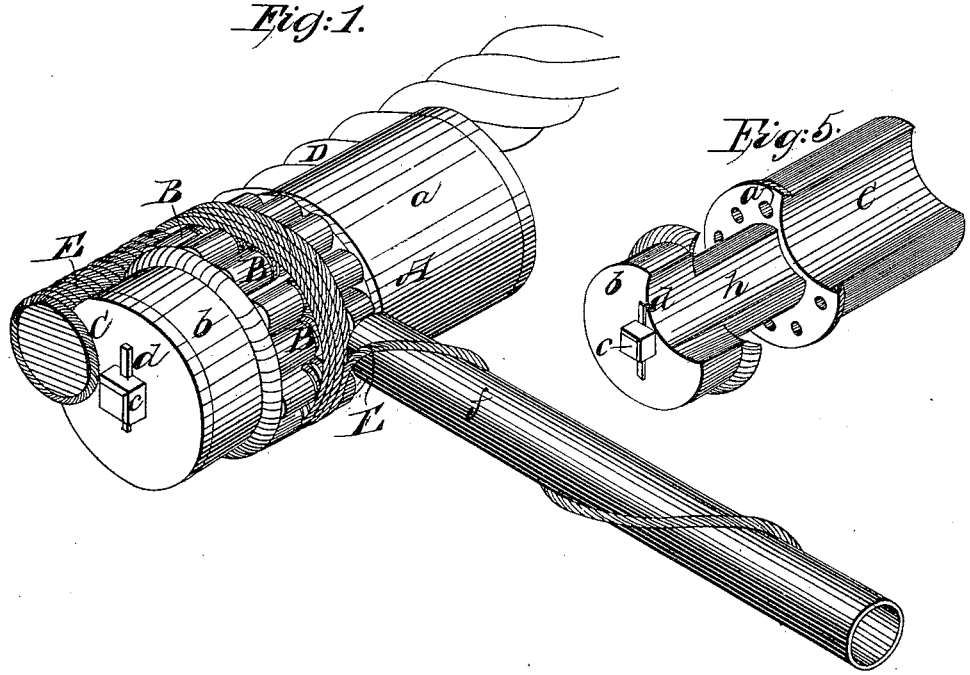
Figure 5:
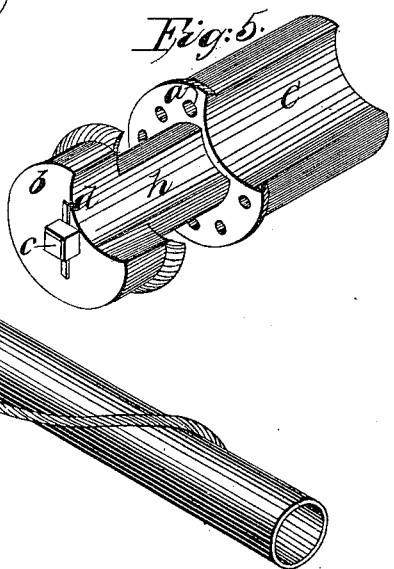
Figure 2:
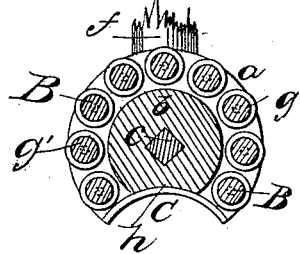
Figure 3:
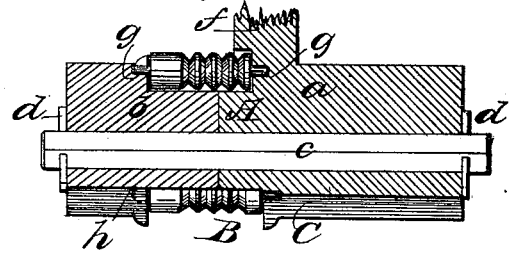
Figure 4:
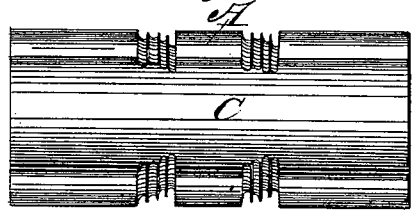

Figure 1, is a perspective view. Fig. 2, is a transverse section of the head, taken through the grooved friction roller. Fig. 3, is a longitudinal section through the center of the head. Fig. 4, is a view of the head of an ordinary serving mallet, after it has been used for a short time. Fig. 5, is a perspective view of the head looking toward the face, the friction rollers being omitted.

Similar letters of reference indicate corresponding parts in each of the several figures.

The nature of my invention consists in the attachment of a series of grooved friction rollers, around that part of the head of the serving mallet on which the spun yarn is wound, the grooves in the rollers being to guide the spun yarn; the object of the rollers is to reduce the immense friction which renders the use of the ordinary serving mallet so extremely laborious, and wears out the mallet so quickly.

It further consists in making the groove in the face of the mallet deeper, at the end which covers the served part of the rope so as to give the mallet an even bearing, and make it finish the work more closely.

To enable others skilled in the art to make and use my invention, I will proceed to describe its construction, operation, and advantages.

A, represents the head of the mallet, which is formed of two parts ($a$), and ($b$), (see Fig. 3) having a square hole through them, through which a bolt ($c$), is tightly fitted, and secured at each end by pins ($d$), ($d$), a recess is made around the head, for the friction rollers to lay in; $f$, is the handle; the mallet may be made of either wood or iron, but I prefer the parts $a$ and $b$, to be of cast iron, and the handle to be cast with the part $a$. B, B, B, are friction rollers having each any required number (say 4) of grooves in their peripheries, and having journals ($g$), ($g$), at their ends fitting easily in holes or bearings within the side faces or shoulders of the recess in the head, each roller having one of its bearings in the part $a$, and the other in the part $b$, the head being made in two parts for convenience of inserting the rollers; the rollers being made of any convenient diameter, and are placed all around the head nearly close together, except at the face which bears on the rope. The groove or face (C), of the head fits to the rope, but instead of being of uniform depth as in the ordinary serving mallet (see Fig. 4), the part ($h$), extending from the shoulder of the part $a$, of the head, to the end of the part $b$, of the same, is deeper than the other part of the face; this is for the purpose of making it fit the served part of the rope, which is of greater diameter than the part which has not been served. D, (Fig. 1), represents part of a rope which is undergoing the operation of serving; E, is the spun yarn or serving which is wound around the head of the mallet and around the handle in the ordinary manner, except that instead of bearing in grooves around the head as in the ordinary mallet (see Fig. 4) it bears in the grooves of the friction rollers B, B, B. It is operated by hand in the same manner as the ordinary serving mallet, which in consequence of the spun yarn being drawn tight and having bearing nearly all around its head, requires great power to be exerted to wind the spun yarn or serving around the rope and a considerable quantity of grease has to be applied to make it slip; but by the application of the friction rollers, the power required to operate the mallet is greatly reduced and no grease need be applied to the serving; a greater amount of work may be performed in the same time and may be done much better, as the face or groove C, being deeper at the part $h$, which fits the served part of the rope, will fit closely to it, and the mallet will finish off the work smoothly.

The ordinary mallet after a few days use is worn out, through the grooves being cut in irregularly by the friction of the spun yarn (see Fig. 4); a set of grooves being cut on each side the handle so that when one set is worn out the other is used, but this improved serving mallet will indure for a great length of time.

What I claim as new in my invention and desire to secure by Letters Patent is—

1. Attaching friction rollers to the periphery of a serving mallet substantially in the manner and for the purposes herein described.

2. Making the groove or face (C), deeper or larger at the part (h), which fits the served part of the rope, in the manner and for the purposes substantially as herein described.

THOMAS BATTY.

Witnesses:
O. D. MUNN,
S. H. WALES.